(12) United States Patent
Farrell et al.

(10) Patent No.: US 7,560,085 B2
(45) Date of Patent: Jul. 14, 2009

(54) POROUS SILICON PARTICLES

(75) Inventors: Declan Farrell, Dun Laoghaire (IE);
Santosh Y Limaye, El Cajon, CA (US);
Shanthi Subramanian, San Diego, CA (US)

(73) Assignee: Vesta Research, Ltd., County Dublin (IE)

( * ) Notice: Subject to any disclaimer, the term of this patent is extended or adjusted under 35 U.S.C. 154(b) by 498 days.

(21) Appl. No.: 11/381,777

(22) Filed: May 5, 2006

(65) Prior Publication Data

US 2006/0251562 A1  Nov. 9, 2006

Related U.S. Application Data

(60) Provisional application No. 60/678,979, filed on May 9, 2005.

(51) Int. Cl.
*C01B 33/02* (2006.01)
*B32B 5/16* (2006.01)

(52) U.S. Cl. ............... 423/348; 423/349; 423/350; 428/402

(58) Field of Classification Search ........... 423/348, 423/349, 350; 428/402, 404, 405
See application file for complete search history.

(56) References Cited

U.S. PATENT DOCUMENTS

| | | | |
|---|---|---|---|
| 4,755,368 A * | 7/1988 | Ulrich et al. ............ 423/337 |
| 5,695,617 A * | 12/1997 | Graiver et al. .......... 204/157.41 |
| 6,491,929 B1 | 12/2002 | Anderson |
| 6,666,214 B2 | 12/2003 | Canham |
| 6,770,480 B1 | 8/2004 | Canham |
| 6,803,244 B2 | 10/2004 | Diener et al. |
| 6,984,274 B2 | 1/2006 | Hofmann et al. |
| 7,244,513 B2 * | 7/2007 | Li et al. .................. 428/613 |
| 7,371,666 B2 * | 5/2008 | Swihart et al. ........... 438/507 |
| 2002/0034646 A1 | 3/2002 | Canham |
| 2002/0068419 A1 | 6/2002 | Sakaguchi |
| 2003/0148008 A1 | 8/2003 | Robinovitch |
| 2004/0010313 A1 * | 1/2004 | Aston et al. ............. 623/17.11 |
| 2004/0052865 A1 | 3/2004 | Gower |
| 2004/0161369 A1 | 8/2004 | Chan |
| 2004/0166319 A1 | 8/2004 | Li |
| 2004/0191320 A1 * | 9/2004 | Canham et al. .......... 424/489 |

(Continued)

FOREIGN PATENT DOCUMENTS

EP  0206795 A2  12/1986

(Continued)

OTHER PUBLICATIONS

R.W. Fathauer et al., Visible Luminescence from Silicon Wafers Subjected to Stain Etches; Appl. Phys. Lett.; Feb. 24, 1992; pp. 995-997; vol. 60 (8); American Institute of Physics; US.

(Continued)

*Primary Examiner*—Roy King
*Assistant Examiner*—Xiaobei Wang
(74) *Attorney, Agent, or Firm*—Joy L. Bryant

(57) ABSTRACT

Porous silicon particles are prepared from a metallurgical grade silicon powder having an initial particle size greater than about 1 micron is presented. Each porous silicon particle comprises a solid core surrounded by a porous silicon layer having a thickness greater than about 0.5 microns.

40 Claims, 2 Drawing Sheets

U.S. PATENT DOCUMENTS

| | | | |
|---|---|---|---|
| 2004/0244889 | A1 | 12/2004 | Sailor |
| 2004/0266050 | A1* | 12/2004 | Benzel et al. .................. 438/53 |
| 2007/0269411 | A1* | 11/2007 | Sun et al. .................. 424/93.2 |
| 2008/0230781 | A1* | 9/2008 | Numasawa et al. ........... 257/52 |

FOREIGN PATENT DOCUMENTS

| | | |
|---|---|---|
| EP | 0341923 A2 | 11/1989 |
| EP | 1231259 A2 | 8/2002 |
| WO | WO 0144140 A1 | 6/2001 |

OTHER PUBLICATIONS

A.N. Parbukov et al., The Production of a Novel Stain-Etched Porous Silicon, Metallization of the Porous Surface and Application in Hydrocarbon Sensors; Materials Science and Engineering; 2001; pp. 121-123; vol. C 15; Elsevier Science B.V.

E. Vazsonyi et al., Porous Silicon Formation by Stain Etching; Thin Solid Films; 2001; pp. 295-302; vol. 388; Elsevier Science B.V.

L.T. Canham, Silicon Quantum Wire Array Fabrication by Electrochemical and Chemical Dissolution of Wafers; Sep. 3, 1990; pp. 1046-1048; vol. 57(10); Appl. Phys. Lett.

A.J. Stecki et al., Photoluminescence from Stain-Etched Polycrystalline Si Thin Films; Apr. 26, 1993; pp. 2111-2113; vol. 62(17); Appl. Phys. Lett.

Michael T. Kelly et al., High Efficiency Chemical Etchant for the Formation of Luminescent Porous Silicon; Mar. 28, 1994; pp. 1693-1695; vol. 64(13); Appl. Phys. Lett.

Chi-Woo Lee, Buem-Suck Kim, Dong-Il Kim, Nam-Ki Min and Suk-In Hong, "Photoluminescence from nano porous silicon prepared by photoelectrochemical etching of n-type single crystalline silicon," Mat. Res. Soc. Symp. Proc., 2001, pp. F.5.29.1-F.5.29.6, vol. 638, Materials Research Society.

\* cited by examiner

POROUS SILICON PARTICLES

CROSS-REFERENCE TO RELATED APPLICATIONS

This application claims the benefit of U.S. Provisional Pat. Application Ser. No. 60/678,979, entitled, "Silicon Nanosponge Particles, Articles and Method Relating Thereto," filed May 9, 2005, which is hereby incorporated by reference in its entirety.

FIELD OF THE INVENTION

The present invention is related to porous. silicon. In particular, it is related to porous. silicon particles prepared from a metallurgical grade silicon powder.

BACKGROUND OF THE INVENTION

The anodization of single crystalline silicon wafers in hydrofluoric acid (HF)-ethanol solutions, results in the formation of pores along certain crystal orientations <100>. This form of silicon is known as porous. silicon and is typically formed by immersing a single crystalline wafer in an HF-ethanol electrolyte and applying a positive potential. Porous. silicon formed by electrochemical etching is usually in the form of a single layer on a single crystalline wafer. Depending on the etching conditions, pore sizes can range from nanometers to tens of micrometers. porous silicon is classified as either macroporous. (pore diameter d>50 nm), mesoporous. (2 nm<d<50 nm) or microporous. (d<2 nm). microporous. silicon is also referred to as nonporous. silicon. In order to prepare porous. silicon powder from porous. silicon layers formed on single crystalline wafers, the porous. layer must be detached and further agitated to create porous. particles. This process has several drawbacks and limitations. During the processes of drying the porous. layer and agitation, the silicon structure is likely to crack. Also, the yield of porous. silicon (48% porosity) from a 4 inch diameter wafer, created by anodizing for 5 minutes at a growth rate of 1.3 microns/minute, is only 0.7% per gram of starting material. Next, scale-up of this process is difficult because the yield of porous. silicon from the process is limited by the diameter of the silicon wafers. In addition, there are many challenges in scaling up electrochemical etching processes to large diameter wafers. Some of these challenges include: the difficulty in achieving a safe and reliable cell design for withstanding extremely corrosive chemicals; making an ohmic contact over the back side of the wafer in order to ensure uniform etching; controlling flow of the electrolyte across the wafer for uniform current density; and the general cost of large diameter silicon wafers. It is for these reasons that there is a need for a low cost and reliable production method capable of producing large quantities of porous. silicon.

Li et al. (U.S. Pat. Application Publication No. U.S.2004/0166319) describe a porous. silicon powder comprising individual silicon particles wherein only the outermost layer of each individual particle is porous. In particular, the porous. layer has a maximum thickness of only 500 nm (0.5 microns). In making these particles, a stain etch method is employed. A porous. silicon powder is subjected to ultrasonic agitation to yield individual silicon nanoparticles. This process allows for using powders instead of single crystalline silicon wafers, enabling etching of a much higher surface area per gram of the material. In addition, this process can produce nanoparticles doped with any type of dopant (n-type, p-type, etc.) if appropriately-doped silicon is used as a precursor material. Examples of various. known dopants include arsenic (As), gallium (Ga), phosphorus. (P), boron (B), antimony (Sb), erbium (Er), and combinations thereof. Stain-etching is typically performed in an aqueous. mixture of hydrofluoric and nitric acids. The reaction process can be described as:

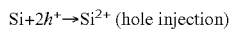
$Si + 2h^+ \rightarrow Si^{2+}$ (hole injection)

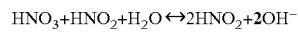
$HNO_3 + HNO_2 + H_2O \leftrightarrow 2HNO_2 + 2OH^-$

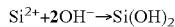
$Si^{2+} + 2OH^- \rightarrow Si(OH)_2$

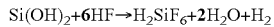
$Si(OH)_2 + 6HF \rightarrow H_2SiF_6 + 2H_2O + H_2$

The regeneration of $HNO_2$ makes the reaction autocatalytic and the etching rate depends upon the amount of $NO_2$ formed in the reaction:

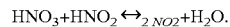
$HNO_3 + HNO_2 \leftrightarrow 2_{NO2} + H_2O$.

Thus, the process is limited by the presence of $HNO_2$ at the surface of the silicon sample. In order to make silicon nanoparticles, the porous. silicon powder is ultrasonically agitated in a suitable solvent which causes the porous. outermost layers to break up and be dispersed into the solvent. Hence, a mechanical action between the porous. silicon layers of the powder and cavitation bubbles induced by ultrasonic agitation result in the generation of individual silicon nanoparticles. However, in all instances, the resulting silicon nanoparticles must be separated from the remnants of the larger silicon particles and the porosity is limited to a maximum thickness of only 500 nm (0.5 microns).

An object of the present invention is to provide porous silicon particles, each particle having a solid core and a porous. silicon layer surrounding the solid core, where the porous. silicon layer has a thickness greater than about 0.5 microns.

Another object of the present invention is to provide a method for producing porous. silicon particles prepared from metallurgical grade silicon powder.

SUMMARY OF THE INVENTION

Porous. silicon particles are prepared from a metallurgical grade silicon powder. The metallurgical grade silicon powder has an initial particle size greater than about 1 micron. Each porous. silicon particle comprises a solid core surrounded by a porous. silicon layer. having a thickness greater than about 0.5 microns. In preparing the porous. silicon particles of the present invention, the metallurgical grade silicon powder has an initial particle size ranging from about 1 mm to about 3 mm. The silicon powder is treated to yield silicon particles having particle sizes ranging from about 0.1 microns to about 40 microns. The silicon particles are separated to isolate the silicon particles having a particle size greater than about 1 micron. The isolated silicon particles are etched to yield porous. silicon particles. The porous. silicon particles of the present invention are unique in that each particle has a solid core surrounded by a porous. silicon layer having a thickness greater than about 0.5 microns. This structure enables the porous. silicon particles to be Useful as carrier materials for a broad range of applications such as catalysts and drugs, adsorbents, sensors, explosives, photosensitizers, precursors for high surface area forms of ceramics such as SiC and $Si_3N_4$ and as electrodes in fuel cells.

Additional objects and advantages of the invention will be set forth in part in the description which follows, and in part, will be obvious. from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principals thereof, and in which.

DETAILED DESCRIPTION OF THE PREFERRED EMBODIMENTS

Figure 1:
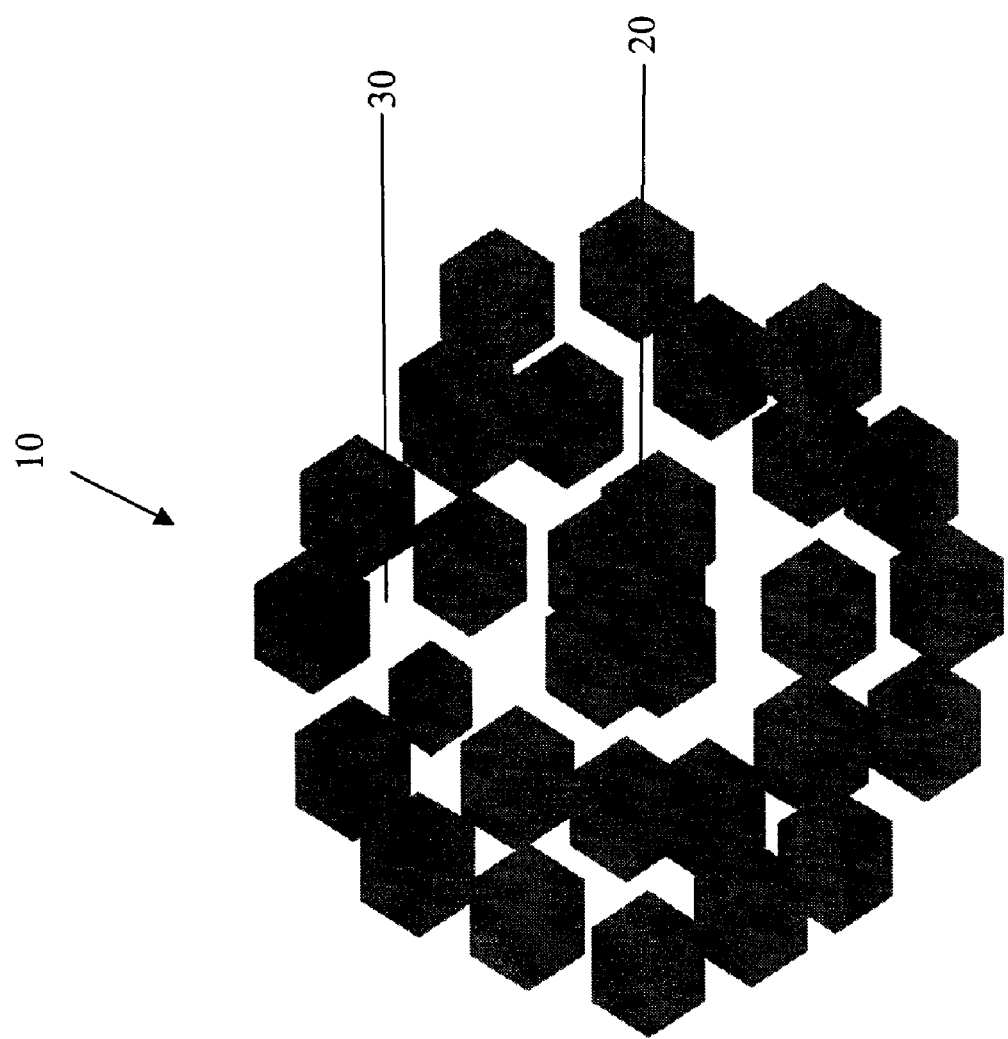
FIG. 1 is a schematic representation of a porous. silicon particle of the present invention.

The present invention is directed towards porous silicon particles prepared from a metallurgical grade silicon powder. The metallurgical grade silicon powder has an initial particle size greater than about 1 micron. Referring now to FIG. 1, a porous. silicon particle 10 of the present invention is depicted. It is important to note that the porous. silicon particles 10 of the present invention are distinguished from the porous. silicon particles found in the prior art in several ways. First, the porous layer 30 which surrounds the solid core 20 of the particle extends deeper into the particle than the porous. layers taught in the prior art. In other words, the porous. layer is thicker than that taught in the prior art. Moreover, there is no need for a grinding step to form porous. particles because the starting material is a powder. By having increased porosity and/or deeper penetration of the pores, the porous. silicon particles of the present invention are suitable for a broader range of uses. The porous. silicon particle 10 of the present invention comprises a solid core 20 surrounded by a porous. silicon layer 30 having a thickness greater than about 0.5 microns. Preferably, the porous. silicon layer has a thickness ranging from about 0.6 microns to about 2.0 microns. These thicker porous. silicon layers lead to increased surface area for each porous. silicon particle. Each porous. silicon particle preferably has a particle size ranging from about 1 micron to about 40 microns.

As an additional embodiment of the invention, the porous. silicon particles are surface treated such that the porous. silicon particles have at least one surface functional group. Such surface treatment includes but is not limited to treating with an organic or inorganic compound or element. Any compound, element, or process known to one of ordinary skill in the art may be used and, preferably, the surface functional group is selected from the group consisting of: hydrogen, oxygen, a halogen, alkenyl, alkyl, organoamine, alkoxy, ester, aldehyde, ketone, carboxylate, and an aryl group and combinations thereof. Surface functional groups enable the porous. silicon particles to be suitable for a broad range of applications—from drug delivery to explosives.

Figure 2:
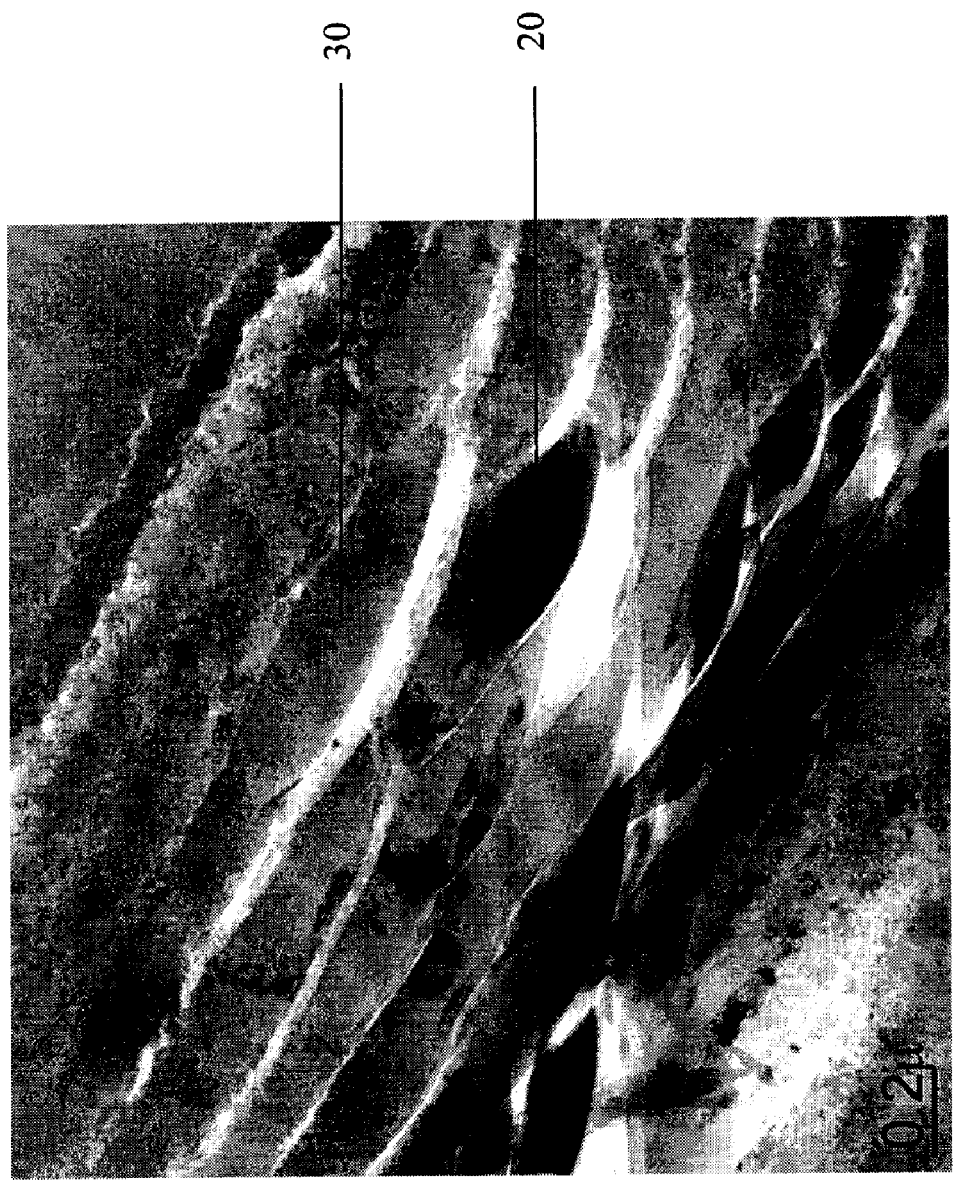
FIG. 2 is a transmission electron micrograph of a porous. silicon particle of the present invention.

FIG. 2 is a high resolution transmission electron micrograph (TEM) image of a porous. silicon particle of the present invention. The image shows a solid core 20 with pores 30 surrounding the solid core. These pores may be of varying size and have an average pore diameter ranging from about 2.0 nm to about 8.0 nm as calculated from nitrogen adsorption isotherm data using the Barret-Joyner-Halenda scheme.

The ability to form porous. silicon particles resides in the starting material used to produce the particles. The particles of the present invention are prepared from a metallurgical grade silicon powder having an initial particle size of greater than about 1 micron. For the purpose of this Pat. application and the claims, metallurgical grade silicon powder is defined as powder produced from the raw silicon product of a silicon smelting and grinding process whereby the raw silicon product has not been further refined to make the silicon suitable for electronic, semi-conducting, and photovoltaic applications. In other words, various. impurities from the smelting and grinding process remain within the silicon powder as used. It has been discovered that the impurities in the metallurgical grade silicon powder impart certain benefits to the silicon particle making process. In particular, since the impurities are susceptible to preferential etching relative to the rate of etching of silicon, the impurities are etched at a faster rate, thus. permitting deeper penetration of pore formation into the silicon particle, instead of restricting etching at the surface. Any metallurgical grade silicon powder known to one of ordinary skill in the art may be employed for the present invention. For the purpose of this application and the appended claims, metallurgical grade silicon powders are defined as those powders which are comprised of, at a minimum, Si, Fe, Al, and Ca. In particular, typical metallurgical grade silicon powders suitable for the present invention have the compositions of those shown in Table 1.

TABLE 1

| Element | Weight Percent |
|---------|----------------|
| Si      | 98.6-99.00     |
| Fe      | 0.03-0.50      |
| Al      | 0.05-0.2       |
| Ca      | 0.00-0.08      |
| C       | 0.00-0.15      |
| $O_2$   | 0.2-1.0        |

These powders are known as 2B, 2C, 2D, 2E, 2F and 4B, 4C, 4D, 4E, 4F and are commercially available from Vesta Ceramics, AB in Sweden. Preferably, the resulting porous. silicon particles comprise silicon and aluminum. Most preferably, the resulting porous. silicon particles comprise silicon at a concentration ranging from about 99% by weight to about 100% by weight and aluminum at a concentration ranging from about 0% by weight to about 1% by weight. It is understood in the art that the resulting porous. silicon particles may also contain trace amounts of iron, aluminum and calcium or other trace elements that may have been present in the metallurgical grade silicon powder used to fabricate the particles.

The porous. silicon particles are prepared by providing a metallurgical grade silicon powder having a particle size ranging from about 1 mm to about 3 mm. The metallurgical grade silicon powder is treated to yield silicon particles having particle sizes ranging from about 0.1 microns to about 40 microns as measured by laser diffraction. Any method of treatment known to one of ordinary skill in the art may be used to obtain the particles in the desired range. A preferred method of treatment of the silicon powder is jet milling the silicon powder. The silicon particles are then separated to isolate the silicon particles having a particle size greater than about 1.0 micron. The isolated silicon particles are etched to yield the porous. silicon particles of the present invention such that each particle has a solid core surrounded by a porous. silicon layer having a thickness greater than about 0.5 microns.

In etching the isolated silicon particles, any etching method known to one of ordinary skill in the art may be employed. One preferred method of etching is stain etching. There are several known stain etching methods such as those described by Fauther et al. in *Appl. Phys. Lett.*, Vol. 60, No. 8, p. 24, 1992; E. Vazsonyi et al., *Thin Solid Films*, Vol. 388, pp. 295-302, 2001; and Prabukov et al., *Materials Science and Engineering*, Vol. C 15, pp. 121-123, 2001 the references are incorporated herein and summarized as follows. The various. etchant compositions from these references are summarized in Table 2.

TABLE 2

| Etchant Composition | Reference |
|---|---|
| $HF:HNO_3:H_2O$ | Fauther |
| 2 g $NaNO_2$ in 100 ml HF | Fauther |
| 0.2 g $CrO_3$ in 100 ml HF | Fauther |
| $HF:HNO_3:H_2O + NaNO_2$ | Vazsonyi |
| Fluoroboric acid/hexafluorosilicic/ heaxafluoroantimonic/hexafluorotitanic/ hexafluorophosphoric acids + nitric acid | Prabukov |

The preferred stain etching composition of the present invention is that comprising a solution of $HF:HNO_3:H_2O$ at a ratio ranging from about 4:1:20 to about 2:1:10 by weight. The advantage to using this process was found that there is no application of an electrical potential. It was also discovered that the porosity is controlled or determined by the amount of $HNO_3$ Used in the process. By varying the concentration of nitric acid ($HNO_3$) added to the process and allowing the reaction to go to completion, the amount of silicon removed from the particle, thus. affecting the overall porosity, can be controlled. Once the particles have been subjected to the etching process, they are collected and dried, leaving porous. silicon particles where each particle comprises a solid core surrounded by a porous. silicon outerlayer having a thickness greater than about 0.5 microns.

An alternative etching process is that of vapor phase etching. Vapor phase etching involved etching the particles with moist air saturated with $HF/HNO_3$ vapors. As was discussed above, the amount of silicon removed and the overall porosity can be controlled by varying the nitric acid concentration. Having such control is desirable because it enables one to produce particles with varying surface area per gram for the porous. silicon particles.

Another embodiment of the invention involves illumination of the isolated silicon particles during etching. Any means of illumination known to one of ordinary skill in the art may be employed. Preferably, illumination occurs at a wavelength selected from the group consisting of: near infrared, visible, near ultraviolet, far ultraviolet, and extreme ultraviolet radiation. In addition, it was found that the nanocrystal size is controlled based on the both the length of time the isolated particles are exposed to illumination and the illumination wavelength. In essence, by controlling the exposure time and illumination wavelength, the porosity in the particle may be controlled (either by allowing for larger sized pores or by having smaller sized pores).

As an alternative embodiment, the pore size of the silicon particle is controlled by post-etching the particle with a 50% by weight hydrofluoric acid-ethanol mixture. The post-etching treatment provides a method to increase the pore size for applications where this feature is desirable.

It was also found that it is beneficial to maintain a constant temperature within the range from about 0° C. to about 99° C. while etching the isolated particles. In other words, a temperature within the range from about 0° C. to about 99° C. is selected and the temperature is maintained during the course of the reaction. By controlling the temperature at which the etching process occurs, the etching rate is controlled.

As an alternate embodiment of the invention, the porous. silicon particles are dried after etching. Any method of drying known to one of ordinary skill in the art may be used. Preferably the method is a method selected from the group consisting of: air drying; vacuum drying; supercritical drying; freeze drying; and pentane drying. In a most preferred embodiment, when the porous. silicon particles are dried using supercritical drying, the method is done Using carbon dioxide.

Typically, the porous. silicon particles of the present invention have a surface covered by hydrogen atoms, making the particles hydrophobic. For some applications, it may be desirable to change the surface chemistry of the particle. This is accomplished by surface treating the dried porous silicon particles. In one embodiment of the invention, the dried porous silicon particles are surface treated by annealing the dried porous silicon particles at a temperature less than about 300° C. This treatment results in the porous silicon particles having an oxygen backbone and a hydrogen terminated surface. Alternatively, the dried porous silicon particles are surface treated by annealing the dried porous silicon particles at a temperature of about 300° C. in air. This causes the hydrogen atoms on the surface to be effused and the porous silicon particles to have a mono-layer of oxygen bonded to the outer surface. In yet another embodiment, the dried porous silicon particles are surface treated by annealing the dried porous silicon particles at temperatures greater than about 300° C. wherein the porous silicon particles undergo oxidation. When the dried porous silicon particles are annealed at a temperature of about 900° C., the porous silicon particles undergo complete oxidation, forming porous silica.

As yet another embodiment, it may be necessary to functionalize the surface of the porous silicon particle to allow for various. surface-chemistry reactions to take place. In this instance, the dried porous silicon particles are surface treated to yield various. surface functional groups. Any compound, element or process known to one of ordinary skill in the art is Used to provide the surface functional group or groups, and in particular, the surface functional group is selected from the group consisting of: a halogen, alkenyl, alkyl, organoamine, alkoxy, ester, aldehyde, ketone, carboxylate, and aryl group and combinations thereof.

In a most preferred embodiment of the invention, the porous silicon particles are prepared from a metallurgical grade silicon powder having a particle size great than about 1 micron. Each porous silicon particle comprises about 99% by weight to about 100% by weight of silicon and about 0% by weight to about 1% by weight of aluminum. Each porous silicon particle has a solid core surrounded by a porous silicon layer having a thickness ranging from about 0.6 microns to about 2.0 microns.

EXAMPLES

Example 1

Silicon particles were prepared from 2C metallurgical grade silicon powder from Vesta Ceramics, AB in Sweden. The metallurgical grade silicon powder was etched with 750 ml of a 48% HF acid with 1000 ml of water in a propylene bath set at a temperature of 27° C. 100 grams of the 2C metallurgical grade silicon powder was added to form a mixture, which was mixed thoroughly. An approximately 25% solution was prepared from a 65% $HNO_3$ reagent. Approximately 400 ml of the 25% $HNO_3$ solution was added in steps. The reaction product was checked for photoluminescence with an ultraviolet light and the reaction was terminated when photoluminescence was observed. The powder was collected and dried either under vacuum or in air at a temperature of 70° C. for 24 hours. The Brunauer-Emmet-Teller (BET) surface area was obtained by nitrogen gas adsorption measurements in a Micromeretics ASAP 2010 gas adsorption analyzer. Samples were degassed at 100° C. prior to the measurement. The BET surface area was 164 m$^2$/g, pore volume was 0.274 cm$^3$/g, and average pore diameter was 4.5 nm.

Example 2 porous silicon particles were prepared from 4C metallurgical grade silicon powders obtained from Vesta Ceramics AB in Sweden. The metallurgical grade silicon powders were etched with 1500 ml of a 48% hydrofluoric acid with 2000 ml of water in a propylene bath set at a temperature of 27° C. A mixture was formed by adding 200 grams of a 4C metallurgical grade silicon powder to the etchant solution and mixing thoroughly. Three different grades of porous silicon powder were prepared by stepwise adding different amounts of an approximately 25% nitric acid solution to the starting solution. In the first experiment, 480 ml of an approximately 25% nitric acid solution was stepwise added to the starting solution. After the reaction was complete and all the nitric acid was consumed, the powder was collected and dried under vacuum or in air at 70° C. for 24 hours. The reaction was judged to be complete when the foam that is observed during the etching process subsided and no more activity was observed. Similar experiments were conducted with 620 ml of an approximately 25% nitric acid solution and 800 ml of an approximately 25% nitric acid solution. The Brunauer-Emmet-Teller (BET) surface area was obtained by nitrogen gas adsorption measurements in a Micromeretics ASAP 2010 gas adsorption analyzer. Samples were degassed at 100° C. prior to the measurement. The data sown in Table 3 indicates that the surface area is controlled by changing the nitric acid concentration in the bath thereby affecting the extent of etching and the porosity.

TABLE 3

| Sample | Amount of 25% nitric acid in the Etching bath (ml) | Surface area measured by the BET method m$^2$/g |
| --- | --- | --- |
| 4C | 480 | 41.1 |
| 4C | 620 | 56.65 |
| 4C | 800 | 82 |

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. Porous silicon particles prepared from a metallurgical grade silicon powder having a starting composition consisting of from about 98.6 to about 99.0 weight percent Si; from about 0.03 to about 0.50 weight percent Fe; from about 0.05 to about 0.2 weight percent Al; from about 0.00 to about 0.08 weight percent Ca; from about 0.00 to about 0.15 weight percent C; and from about 0.2 to about 1.0 weight percent O$_2$ and wherein the metallurgical grade silicon powder has an initial particle size greater than about 1 micron wherein each porous silicon particle comprises a solid core consisting of the metallurgical grade silicon surrounded by a porous silicon layer having a thickness ranging from about 0.6 microns to about 2.0 microns; wherein each porous silicon particle comprises pores having an average pore diameter ranging from about 2.0 nm to about 8.0 nm as calculated from nitrogen adsorption isotherm data using the Barret-Joyner-Halenda scheme; and a BET surface area of at least 56.65 m$^2$/g.

2. Porous silicon particles according to claim 1, wherein each porous silicon particle has a particle size ranging from about 1 micron to about 40 microns.

3. Porous silicon particles according to claim 1, wherein each porous silicon particle has at least one surface functional group.

4. Porous silicon particles according to claim 3, wherein the surface functional group is selected from the group consisting of: hydrogen, oxygen, halogen, alkenyl, alkyl, organoamine, alkoxy, ester, aldehyde, ketone, carboxylate, and aryl.

5. Porous silicon particles according to claim 1, prepared by:
   a. providing a metallurgical grade silicon powder having a starting composition consisting of from about 98.6 to about 99.0 weight percent Si; from about 0.03 to about 0.5 weight percent Fe; from about 0.05 to about 0.2 weight percent Al; from about 0.00 to about 0.08 weight percent Ca; from about 0.00 to about 0.15 weight percent C; and from about 0.2 to about 1.0 weight percent O$_2$ and wherein the metallurgical grade silicon powder has a particle size ranging from about 1mm to about 3 mm;
   b. treating the metallurgical grade silicon powder to yield silicon particles having particle sizes ranging from about 0.1 microns to about 40 microns;
   c. separating the silicon particles to isolate the silicon particles having sizes greater than about 1.0 micron; and
   d. etching the isolated silicon particles to yield porous silicon particles, each particle having a solid core consisting of the metallurgical grade silicon surrounded by a porous silicon layer having a thickness ranging from about 0.6 microns to about 2.0 microns; wherein each porous silicon particle comprises pores having an average pore diameter ranging from about 2.0 nm to about 8.0 nm as calculated from nitrogen adsorption isotherm data using the Barret-Joyner-Halenda scheme; and a BET surface area of at least 56.65 m$^2$/g.

6. Porous silicon particles according to claim 5, wherein the isolated silicon particles are stain etched.

7. Porous silicon particles according to claim 6, wherein the isolated silicon particles are stain etched with a solution comprising HF:HNO$_3$:H$_2$O at a ratio ranging from about 4:1:20 to about 2:1:10 by weight.

8. Porous silicon particles according to claim 5, wherein the isolated silicon particles are etched by a vapor phase etching process.

9. Porous silicon particles according to claim 8, wherein the vapor phase etching process comprises etching the isolated silicon particles with moist air saturated with HF/HNO$_3$ vapors.

10. Porous silicon particles according to claim 5, further comprising the step of illuminating the isolated silicon particles during etching.

11. Porous silicon particles according to claim 10, wherein illumination occurs at a wavelength selected from the group consisting of: near infrared, visible, near ultraviolet, far ultraviolet, and extreme ultraviolet radiation.

12. Porous silicon particles according to claim 5, further comprising the step of drying the porous silicon particles.

13. Porous silicon particles according to claim 12, wherein the porous silicon particles are dried by a method selected from the group consisting of: air drying; vacuum drying; supercritical drying; freeze drying; and pentane drying.

14. Porous silicon particles according to claim 12, further comprising the step of surface treating the dried porous silicon particles.

15. Porous silicon particles according to claim 14, wherein the dried porous silicon particles are surface treated by annealing the dried porous silicon particles at a temperature less than about 300° C. wherein the porous silicon particles have an oxygen backbone and a hydrogen terminated surface.

16. Porous silicon particles according to claim 14, wherein the dried porous silicon particles are surface treated by annealing the dried porous silicon particles at a temperature of about 300° C. in air wherein surface hydrogen atoms are effused forming a surface mono-layer of oxygen.

17. Porous silicon particles according to claim 14, wherein the dried porous silicon particles are surface treated by annealing the dried porous silicon particles at temperatures greater than about 300° C. wherein the porous silicon particles undergo oxidation.

18. Porous silicon particles according to claim 17, wherein the dried porous silicon particles are annealed at a temperature of about 900° C. wherein the porous silicon particles undergo complete oxidation, forming porous silica.

19. Porous silicon particles according to claim 14, wherein the dried porous silicon particles are surface treated to provide porous silicon particles having at least one surface functional group.

20. Porous silicon particles according to claim 19, wherein the surface functional group is selected from the group consisting of: hydrogen, oxygen, halogen, alkenyl, alkyl, organoamine, alkoxy, ester, aldehyde, ketone, carboxylate, and aryl group.

21. A method for producing porous silicon particles according to claim 1, the method comprising the steps of:
  a. providing metallurgical grade silicon powder having a starting composition consisting of from about 98.6 to about 99.00 weight percent Si; from about 0.03 to about 0.5 weight percent Fe; from about 0.05 to about 0.2 weight percent Al; from about 0.00 to about 0.08 weight percent Ca; from about 0.00 to about 0.15 weight percent C; and from about 0.2 to about 1.0 weight percent $O_2$ and wherein the metallurgical grade silicon powder has a particle size ranging from about 1mm to about 3 mm;
  b. treating the silicon powder to yield silicon particles having particle sizes ranging from about 0.1 microns to about 40 microns;
  c. separating the silicon particles to isolate the silicon particles having a particle size greater than about 1 micron; and
  d. etching the isolated silicon particles to yield porous silicon particles each porous silicon particle comprising a solid core consisting of the metallurgical grade silicon surrounded by a porous silicon layer having a thickness ranging from about 0.6 microns to about 2.0 wherein each porous silicon particle comprises pores having an average pore diameter ranging from about 2.0 nm to about 8.0 nm as calculated from nitrogen adsorption isotherm data using the Barret-Joyner-Halenda scheme; and a BET surface area of at least 56.65 $m^2/g$.

22. A method according to claim 21, wherein the silicon powder is treated by jet-milling.

23. A method according to claim 21, wherein the isolated silicon particles are stain etched.

24. A method according to claim 23, wherein the isolated silicon particles are stain etched with a solution comprising $HF:HNO_3:H_2O$ at a ratio ranging from about 4:1:20 to about 2:1:10 by weight.

25. A method according to claim 21, wherein the isolated silicon particles are vapor phase etched with moist air saturated with $HF/HNO_3$ vapors.

26. A method according to claim 21, further comprising the step of maintaining a constant temperature, wherein the constant temperature is a temperature ranging from about 0° C. to about 99° C. while etching the isolated silicon particles.

27. A method according to claim 21, further comprising the step of illuminating the isolated silicon particles during etching.

28. A method according to claim 27, wherein illumination occurs at a wavelength selected from the group consisting of: near infrared, visible, near ultraviolet, far ultraviolet, and extreme ultraviolet radiation 29. A method according to claim 27, further comprising the step of controlling pore size by illuminating the isolated silicon particles for a determined length of time and controlling the illumination wavelength.

30. A method according to claim 21, further comprising the step of etching the porous silicon particles with a 50% by weight solution of hydrofluoric acid and ethanol.

31. A method according to claim 21, further comprising the step of drying the porous silicon particles.

32. A method according to claim 31, wherein the porous silicon particles are dried by a method selected from the group consisting of: air drying; vacuum drying; supercritical drying; freeze drying; and pentane drying.

33. A method according to claim 31, further comprising the step of surface treating the dried porous silicon particles.

34. A method according to claim 33, wherein the dried porous silicon particles are surface treated by annealing the dried porous silicon particles at a temperature less than about 300° C. wherein the porous silicon particles have an oxygen backbone and a hydrogen terminated surface.

35. A method according to claim 33, wherein the dried porous silicon particles are surface treated by annealing the dried porous silicon particles at a temperature of about 300° C. in air wherein surface hydrogen atoms are effused forming a surface mono-layer of oxygen.

36. A method according to claim 33, wherein the dried porous silicon particles are surface treated by annealing the dried porous silicon particles at temperatures greater than about 300° C. wherein the porous silicon particles undergo oxidation.

37. A method according to claim 36, wherein the dried porous silicon particles are annealed at a temperature of about 900° C. wherein the porous silicon particles undergo complete oxidation, forming porous silica.

38. method according to claim 33, wherein the dried porous silicon particles are surface treated to provide porous silicon particles having at least one surface functional group.

39. A method according to claim 38, wherein the surface functional group is selected from the group consisting of: hydrogen, oxygen, halogen, alkenyl, alkyl, organoamine, alkoxy, ester, aldehyde, ketone, carboxylate, and aryl group.

40. A method for producing porous silicon particles according to claim 1, the method comprising the steps of:
  a. providing metallurgical grade silicon powder having a starting composition consisting of from about 98.6 to about 99.00 weight percent Si; from about 0.03 to about 0.5 weight percent Fe; from about 0.05 to about 0.2 weight percent Al; from about 0.00 to about 0.08 weight percent Ca; from about 0.00 to about 0.15 weight percent C; and from about 0.2 to about 1.0 weight percent $O_2$ and wherein the metallurgical grade silicon powder has a particle size ranging from about 1mm to about 3 mm;

b. jet milling the silicon powder to yield a silicon particles having a particle size ranging from about 0.1 microns to about 40 microns;

c. separating the silicon particles to isolate the particles having a particle size of at least about 1 micron; and d. stain etching the isolated particles with a solution comprising $HF:HNO_3:H_2$ at a ratio ranging from about 4:1: 20 to about 2:1:10 by weight to yield porous silicon particles, each I)article comprising a solid core consisting of the metallurgical grade silicon surrounded by a porous silicon layer having a thickness ranging from about 0.6 microns to about 2.0 microns; wherein each porous silicon particle comprises pores having an average pore diameter ranging from about 2.0 nm to about 8.0 nm as calculated from nitrogen adsorption isotherm data using the Barret-Joyner-Halenda scheme; and has a BET surface area of at least 56.65 $m^2/g$.

* * * * *